Nov. 3, 1964 E. PTACNIK 3,155,835

LINKING CIRCUITS WITH AMPLIFYING PROPERTIES FOR USE IN COMMUNICATION SYSTEMS

Filed Jan. 15, 1962 2 Sheets-Sheet 1

United States Patent Office 3,155,835
Patented Nov. 3, 1964

3,155,835

LINKING CIRCUITS WITH AMPLIFYING PROPERTIES FOR USE IN COMMUNICATION SYSTEMS

Edmund Ptacnik, Munich, Germany, assignor to Siemens & Halske Aktiengesellschaft Berlin and Munich, a German corporation Filed Jan. 15, 1962, Ser. No. 166,125
Claims priority, application Germany Jan. 26, 1961
13 Claims. (Cl. 307—88)

The invention disclosed herein relates to circuits for processing communications which are supplied in the form of binary signals, and is particularly concerned with linking circuits with amplifying properties, for linking two or more binary signals to produce a resultant binary signal, comprising repeater means including a plurality of windings, such repeater means requiring, for the linking operation, triggering merely within the linear part of the magnetizing curve of the core material.

The binary communication signals can assume two different values which are frequently indicated by the letters O and L. The processing leads to a linking of the various supplied signals, such linking resulting likewise in binary signals, thus accounting for the expression "linking circuits" which is being used herein.

Linking circuits having precisely defined linking functions are, for example, designated as Or-gate circuits, And-gate circuits, blocking gate circuits, etc. Diverse embodiments of such linking circuits are known, employing different circuit elements.

The linking circuits may also differ insofar as the mode of operation thereof is concerned. Thus, there are linking circuits known which supply the resultant signal for the duration of the entire interval during which the signals to be linked are present. These are the statically operating linking circuits which are constructed, for example, with the aid of resistors and rectifiers.

However, linking circuits may also be operated impulse-wise instead of statically. In such cases, the signal indicating results of the linking, the resultant signal, is represented by one more or less short impulse or by the omission of such impulse.

Linking circuits of this kind are often constructed with the aid of repeaters, usually employing ring cores having windings consisting of a few turns. The core of such a repeater is in the pertinent known circuits primarily made of a ferromagnetic material with rectangular magnetizing loop, utilizing the two remanence points of the magnetizing loop for characterizing the two conditions of binary signals. Reference may be made for additional information, to the article entitled "Magnetische Schaltkreise zur Darstellung logischer Verknuepfungen" (Magnetic Circuits for Representing Logic Linkings) by H. Gilnert, Darmstadt (Announcement from the Institute for Practical Mathematics (IPM) of the Technical College, Darmstadt, Prof. Dr. A. Walther), published in Nachrichtentechnische Zeitschrift (NTZ) 1957, pages 391 to 402, publisher Friedrich Vieweg and Son, Braunschweig, Burgplatz 1, Germany. This applies particularly also for the resultant signal which represents the result of the linking of supplied signals, such resultant signal being at the desired instant delivered by the linking circuit responsive to a readout impulse. A plurality of repeaters with a plurality of windings have to be provided and circuited in definite manner so as to carry out a more complicated linking of a greater number of signals.

Impulse-wise operated linking circuits having repeaters are also known, wherein the remanence of ferromagnetic material is not utilized. Accordingly, such linking circuits permit utilization of repeaters having cores with largely linear magnetizing curve. The linking function is in such circuits effected in a physically different fashion, making use of other effects occuring in repeaters. It is for example known (see the Swiss Patent No. 331,029) to construct a gate circuit with the aid of a repeater having two windings, requiring the triggering of only the linear part of the magnetizing curve. Ahead of one end of the primary winding of the repeater is disposed a rectifier to which is supplied a voltage for passage therethrough or else a voltage the passage of which is blocked, thus causing impulses conducted to the other end of the primary winding to effect or not to effect a current flow. Accordingly, the secondary winding of the repeater will or will not give off impulses. What is utilized here is the property of repeaters or transformers to transmit an impulse conducted to one winding to another winding, from which the impulse is given off for the resultant signal. The power expanded upon giving off or delivering this impulse must be supplied by the signal which is to be processed. Accordingly, this linking circuit does not have the property of effecting amplification of the supplied signals.

It is moreover also known to alter the impedance of a repeater with the aid of a winding which may or may not be selectively short circuited, for the purpose of extending a supplied impulse over one or another output terminal of the repeater. As shown in the German Auslegeschrift (German Printed Publication) No. 1,083,579, entitled "Logic Switching Element" (applicant, Sperry Rand Corp. New York, N.Y., filed August 16, 1956, laid out for publication June 15, 1960), the repeater of this linking circuit is provided with three windings. To the primary winding is conducted the impulse which is with low impedance of the repeater extended further over such winding, the low impedance of the repeater being achieved by short circuiting a secondary winding. When this secondary winding is not short circuited, the impulse will be extended over a tertiary winding. Accordingly, the repeater or transformer property and the inductance of the repeater are utilized for bringing about the desired operations.

The linking function which is present in connection with this circuit arrangement can be comprehended, for example, as the function of an And-gate circuit. Only when a signal is conducted to one end of the primary winding and when the secondary winding, is at the same time shortcircuited responsive to a further signal, will an impulse for the resultant signal be delivered at the other end of the primary winding. The power required for the resultant signal again depends upon the supplied signal. Accordingly, no amplification of the supplied signals is effected by the operation of this linking circuit.

Different signals in the form of signal currents occurring in the transmission of communications are evaluated with the aid of another known circuit arrangement (see German Patent No. 1,055,060) which is constructed with the use of a repeater. The various signals appear upon a definite line, causing signal currents of different strength to flow in a winding of the repeater. Over a second winding is at the same time conducted a comparison current of invariable, that is, of constant strength. The currents produce jointly a magnetic flux in the repeater, such resulting magnetic flux having one or another direction depending upon the strength of the signal current. Accordingly, upon switching in or disconnection of the noted currents, there will be produced in a third winding an impulse of negative or positive polarity, the polarity of such impulse indicating whether the signal current is below or above a given strength.

While different communications in the form of binary signals are processed with the aid of a linking circuit such as initially explained, so as to produce a binary resultant signal derived therefrom, only a single signal is in the above described circuit supplied at any one time, which signal is to be tested, whereby a binary signal is given off as a result of such testing. The operation resides basically in a binary quantizing of a previously unstaged signal with the aid of a comparison circuit. A linking of a plurality of independent and different, simultaneously occurring binary signals, is not affected. It must be considered in this connection that the current which is in a given case conducted to the second winding has always the same strength and therefore does not correspond to a binary signal. This comparison circuit therefore does not represent a linking circuit in the sense herein applied. Moreover, the power of the delivered resultant signal is again supplied by the signal which is extended to the circuit, and the circuit likewise does not have any amplification properties.

It is, however, in large capacity communication processing systems desirable to employ linking circuits which affect in addition to the linking also an amplification of the signals, so as to make it possible to evaluate signals which are supplied with low power. Upon using repeaters as components for such linking circuits, there will be gained the advantage that an electrical separation can be effected between circuits over which are supplied the signals which are to be linked, and the circuits over which are delivered the resultant signals. The insertion of the linking circuits between the individual parts of the communication or message processing apparatus is thereby considerably facilitated. It was also found that the resultant signals can be extraordinarily rapidly obtained, for example, in fractions of microseconds, upon using repeaters with utilization of the linear portion of the magnetizing curve of the core material thereof.

The present invention shows a way of constructing a linking circuit with amplifier properties, for carrying out linkings between two or more binary signals, for the production of a binary resultant signal, with the aid of a repeater having a plurality of windings, such repeater requiring for the linking operation a triggering merely in the linear part of the magnetizing curve of the core material. To the linking circuit according to the invention is conducted a reading impulse which supplies the power for the resultant signal signifying the linking result, such resultant signal being represented by the appearance or non-appearance of an output impulse, the reading impulse being distributed over input windings of the repeater, the winding sense and number of turns of the windings being selected in accordance with the desired linking function, the current flow in said windings, except if desired in one winding, serving as input comparison winding, being blocked or operatively effected in accordance with the binary value of the signals to be linked, so as to produce in a given case, depending upon the binary value of the supplied signal, an output signal belonging to the resultant signal in at least one output winding provided therefor.

The remanence of the magnetic core material is not relied upon since the linking circuit according to the invention utilizes only the linear part of the magnetizing curve. It is accordingly unnecessary to provide for the course of the linking functions special restoring pulses for obtaining prior to a linking of signals a predetermined initial condition of the core material.

Inasmuch as the remanence of the magnetic core material is not employed, it is likewise unnecessary to trigger the magnetizing curve up to its remanence points. The triggering of the magnetizing curve is accordingly always very quickly concluded, thus making it possible to operate the linking circuits according to the invention with very high speed. Owing to the resulting greater alterations of the magnetic flux $$\left(-\frac{d\phi}{dt}\right)$$

there will be obtained, even upon using small ring cores with but a few windings or only one winding, voltages in the output windings which can be well evaluated.

All these advantages make it possible to use the linking circuits according to the invention in most varied manner.

The invention will now be described more in detail with reference to the accompanying drawings showing a great number of embodiments of linking circuits employing the various features thereof.

Figure 17:
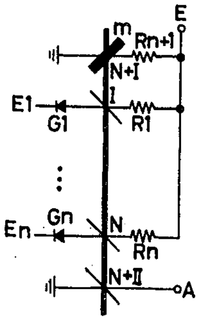
Figure 18:
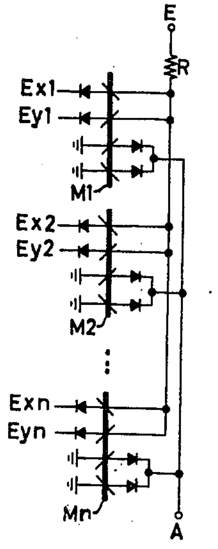
Figure 19:
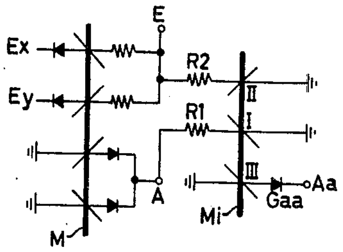
Figure 20:
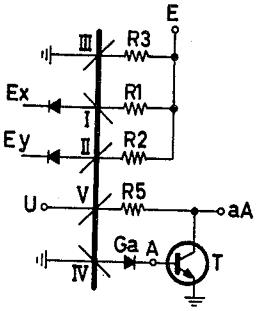

FIG. 17 indicates a further example of a linking circuit for processing more than two binary signals;

FIG. 18 represents an example of an arrangement employing a plurality of linking circuits according to the invention;

FIG. 19 shows among other an inversion circuit adapted for inverting resultant signals; and FIG. 20 illustrates an example of utilizing the repeater employed in given cases for the further amplification of resultant signals by means of feedback-coupled amplifying systems.

The method of circuit representation will now be explained with the aid of FIG. 1, reference being also made in this connection to Proceedings of the IRE, May 1955, page 572 et seq.

Figure 1:
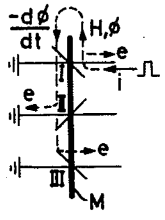
FIG. 1 shows an arrangement intended to explain the very particular method of circuit representation which is being employed.

In FIG. 1, the core of the repeater is represented by the prominently drawn vertically extending line. This vertical line is perpendicularly crossed by horizontally extending lines I, II, III, each such line indicating a winding. The sense of direction of the respective windings is indicated by diagonal lines. Windings marked by parallel extending diagonal lines are wound in identical sense of direction, and windings marked by oppositely slanted diagonal lines are wound in opposite sense of direction. The diagonal lines also permit determination of the polarity of an impulse induced into the respective winding. For example, when the positive impulse $i$ indicated in FIG. 1, is conducted to the winding I, a voltage is in known manner induced in such winding, the polarity of which is opposed to the voltage which is produced by the current impulse $i$. A voltage with such polarity is also induced in other windings which are wound in the same sense of direction as the winding I, winding III being such other winding as indicated by the diagonal line thereof which slants in a direction parallel to the diagonal line of the winding I. The appearance of these induced voltages is indicated by arrows $e$ pointing to the right. Assuming the winding III to be connected in a closed circuit, a current impulse will flow in the direction indicated by the arrow. The winding II, as indicated by the diagonal line crossing it, is wound in a sense of direction opposite to that of the windings I and III, and the arrow $e$ therefore points in opposite direction, to the left. The diagonal lines which indicate the sense of direction of winding of the respective windings can also be comprehended as mirrors for the directions of the respective electrical values. Thus, upon mirroring at the diagonal line of the winding I the direction of the impulse $i$, there will be obtained the direction of the magnetic field strength H and of the magnetic flux $\phi$ in the core. The direction of the flux alteration, which is equal to $$-\frac{d\phi}{dt}$$

and which induces a voltage in a winding, is then oppositely oriented. Upon mirroring this direction at the diagonal line of a given winding, there will be obtained the polarity of the voltage impulse induced thereinto and also the direction of the impulse current that may be flowing therethrough. These mirrorings are indicated in FIG. 1 by broken lines and by arrows marked by the designations discussed.

The arrangement shown in FIG. 2 will now be explained in detail, as the first example of a linking circuit according to the present invention.

Figure 2:
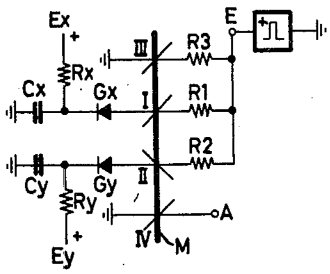
FIGS. 2 to 9 illustrate linking circuits for respectively linking two binary signals.

Referring to FIG. 2, the core M of the repeater of such linking circuit is provided with four windings. The windings I, II, III are input windings. The current flow in the input windings I and II is in the measure of the binary value of the two supplied signals either blocked or permitted. To the input winding III is conducted a comparison pulse which is independent of the signals, and such winding will hereinafter be referred to as input comparison winding. The current flow in such winding is accordingly independent of the binary signals which are to be linked. In addition to the input windings, there is also provided an output winding IV in which is produced in given cases, in a manner to be presently explained, an output pulse belonging to the resultant signal. One end of the winding IV is connected to ground and the other end extends to the terminal A at which the output pulse is given off. One end of the input winding III is likewise connected to ground and the other end thereof is extended to the terminal E to which is conducted the readout pulse, the latter being also conducted to the input windings I and II. At the ends of these input windings which face away from the terminal E, the current flowing thereover is affected in accordance with the value of the binary signals which are to be processed. This may be effected, for example, by means of contacts which may be inserted between ground and the corresponding ends of the input windings, such contacts being either closed or open, thus making the current flow either possible or blocking it. However, such contacts always have a certain inertia which noticeably limits the speed of operation of the linking circuit.

In order to avoid this limitation, the current flow in the concerned input windings is affected in different manner. The two values O and L of the binary signals which are to be processed are represented by the non-appearance or by the appearance of a positive signal voltage which is at least as high as the positive voltage which produces the readout pulse. One of the binary signals shall be designated by $x$ and the voltage that may be related thereto by $Ex$. The other binary signals shall be designated by $y$ and the voltage that may be in a given case related thereto shall be designated by $Ey$. In order to permit utilization of this voltage directly for affecting the current flow, there are provided rectifiers $Gx$ and $Gy$ which are disposed in series with respective input windings, such rectifiers being polarized so that they may provide a blocking action by the effect of the voltage $Ex$ and $Ey$. When this happens, the current flow through the input windings I and II will be blocked. However, in the absence of the voltages $Ex$ and $Ey$, current will, responsive to the appearance of the readout pulse, also flow over these input windings. The circuit may for example be closed over the voltage sources for the voltages $Ex$ and $Ey$ or, as indicated in FIG. 2, over the capacitors $Cx$ and $Cy$ which are connected with the rectifiers $Gx$ and $Gy$, and which are adapted to pass sufficiently short impulses.

As shown in FIG. 2, the voltages $Ex$ and $Ey$ are extended over the resistors $Rx$ and $Ry$. The strength of the current appearing, responsive to the connection of a readout pulse, in the various input windings, is determined either by the inherent resistance of the respective resistors or may depend upon the number of turns of the windings, or may be limited by resistors such as R1, R2, R3 which are individually connected ahead of the respective input windings. These resistors are dimensioned so that they provide for equal current strength in the three input windings. The input windings also have the same number of turns, but are not wound in the same sense of direction. As indicated by the diagonal crossing lines, the input windings I and II are wound in opposite sense of direction. The winding III is wound in a sense of direction corresponding to that of one of the input windings while being opposite to that of the other input winding. The linking function resulting in this arrangement is determined by the different sense of direction of the input windings which have the same number of turns. The peculiarity of this linking function will appear from a consideration of different operating conditions.

A linking circuit serving for the linking of two binary signals has as is known four different operating conditions, since the two signals $x$ and $y$, extended thereto, may have the value O, O; L, O; O, L; or L, L.

In case both of the signals $x$ and $y$ have the value O, the voltages $Ex$ and $Ey$ will be absent. The readout pulse is therefore distributed in equal parts over all three input windings I, II and III. The magnetic effect of the current flowing during the readout pulse through the windings I and II is thereby compensated. The part of the readout pulse flowing through the winding III produces in the output winding IV an output impulse which appears at the terminal A as a voltage impulse, or which can be taken off at such terminal as a current impulse, if there is a circuit of which the winding IV is a part.

In case the supplied signal $x$ has the value L and the supplied signal $y$ has the value O, that is, when only the voltage $Ex$ is conducted to the linking circuit, the winding I will be blocked against current flow and the readout pulse will be symmetrically distributed to the input windings II and III. These windings are wound in opposite sense of direction. Accordingly, the two partial currents of the readout pulse will compensate or cancel each other, and no output pulse will be produced in the output winding IV.

In the event that the supplied signal $x$ has the value O while the signal $y$ has the value L, that is, that only voltage $Ey$ is extended to the linking circuit, the winding II will be blocked against current flow. The readout impulse will in such case affect both input windings, and since these windings are wound in the same sense of direction, there will be produced an output impulse in the winding IV.

In case both the supplied signals $x$ and $y$ have the value L, the voltages $Ex$ and $Ey$ will be placed on the the rectifiers of the input windings I and II and these input windings will accordingly be blocked against current flow. The readout impulse will produce a current flow only in the winding III, resulting in the appearance of an output impulse in the winding IV.

It will be seen from the foregoing explanations that an output impulse will be produced whenever the signal $x$ has the value O or the signal $y$ the value L or when these two conditions are simultaneously present, that is, when the signal $x$ has the value O and the signal $y$ the value L.

Upon reversing the sense of direction of the windings I and II, there will be produced an analogous linking circuit in which the role of the binary values O and L are exchanged with respect to the signals $x$ and $y$. An output impulse is in such case delivered when the signal $x$ has the value L or when the signal $y$ has the value O or when both conditions are present, that is, when the signal $x$ has the value L while the signal $y$ has the value O.

Figure 3:
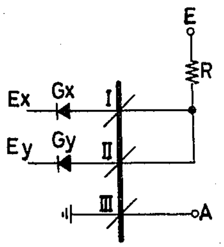

Another example of a linking circuit according to the invention is shown in FIG. 3. As in the previously described circuit, rectifiers are again connected ahead of the input windings I and II which are affected by the signals which are to be linked. These rectifiers are again marked by $Gx$ and $Gy$. The voltages connected with these signals are designated by $Ex$ and $Ey$. Identical designations are employed in connection with the remaining figures. The circuit elements required for operatively connecting these voltages and for closing the circuits of the readout pulse have been omitted in the figure. The corresponding circuit as well as the circuits shown in the remaining figures can be completed or supplemented in these respects, for example, by entering in the respective figures details such as they appear in connection with the linking circuit illustrated in FIG. 2.

To the rectifiers G$x$ and G$y$ (FIG. 3), which are disposed ahead of the input windings I and II are in a given case extended the voltages E$x$ and E$y$ depending upon the values of the supplied signals. An output signal will in a given case appear in the winding III which serves as an output winding. In this linking circuit, all three windings are wound in the same sense of direction. The two input windings are mutually symmetrical and these windings therefore are, responsive to a readout pulse applied thereto in common, traversed by current of identical strength. Instead of employing individual resistors for limiting the readout pulse for the respective windings, there is for this purpose provided a common resistor R.

Since this circuit also has to link two binary signals, four different operating conditions will appear in connection therewith. It will now be shown that the linking differs in this case from that discussed with reference to FIG. 2.

Assuming that the signals $x$ and $y$ have the value O, the rectifiers G$x$ and G$y$ at the input windings I and II will not be blocked by a voltage connected thereto. Accordingly, when a readout pulse is conducted to the input windings I and II, both these windings will be traversed by current resulting therefrom, and in the output winding III will be produced an output pulse.

When the signal $x$ has the value L and the signal $y$ the value O, the voltage E$x$ will be placed on the rectifier G$x$, thus blocking the current flow at the input winding I. The readout pulse will accordingly flow through the winding II and an output pulse will consequently appear in the output winding III.

In the event that the signal $x$ has the value O and the signal $y$ the value L, the voltage E$y$ will be placed on the rectifier G$y$, thereby blocking the current flow through the input winding II, the readout pulse flowing only through the input winding I. An output pulse will consequently again appear in the output winding III.

Finally, in case the signal $x$ as well as the signal $y$ have the value L, both input windings I and II will be blocked against current flow and, consequently, no current can flow through the input windings responsive to the readout pulse and no impulse will appear in the output winding III. An output impulse will thus appear only in the other above explained operating conditions.

The linking circuit shown in FIG. 3 therefore represents an inverting And-gate circuit, sometimes also referred to as Sheffer's line.

The sense of winding direction of the output winding does not play any particular role in the two above described linking circuits. It may however happen that this winding has to be wound with a definite sense of direction so as to obtain a desired linking function. A rectifier has to be disposed for cooperation with the respective winding in such case so as to effect giving off only impulses of definite polarity appearing in such winding. It may moreover happen that impulses of different polarities appear in the output winding, which impulses have to be given off regardless of the polarity thereof. However, if it is desired that only impulses of the same polarity are given off, such function may be obtained by providing, instead of one output winding, two output windings wound in opposed sense of direction and respectively provided with identically poled rectifiers which are connected to the same output terminal. The result of the provision of output windings wound in suitable sense of direction and having rectifiers cooperatively connected therewith is, that only output pulses are given off corresponding to the desired linking function.

Examples of linking circuits will now be first explained, comprising respectively only one output winding wound in a definite sense of direction and having a rectifier cooperating therewith.

Figure 4:
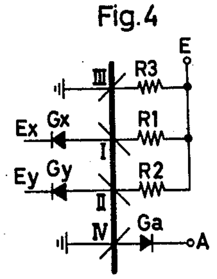

An example of such a linking circuit is illustrated in FIG. 4. Upon the core of the repeater are provided two input windings I and II respectively cooperating with the rectifiers G$x$ and G$y$ to which are conducted the signals $x$ and $y$ which are to be linked, and also the input comparison winding III. The input windings I and II are wound in a sense of direction opposite to that of the input comparison winding III. Each input winding is individually provided with a resistor, shown respectively at R1, R2 and R3. These resistors effect symmetrical distribution of the readout pulse to the various input windings. The output winding IV is cooperatively connected with the rectifier G$a$; its sense of winding direction corresponds to that of the input comparison winding III. As in the previously explained embodiments, four different operating conditions are again to be considered.

In the first operating condition, the signals $x$ and $y$ which are to be linked, have the value O. Accordingly, there will not be any blocking voltage on the rectifiers G$x$ and G$y$. The magnetic effects of the currents flowing over the input windings I and II are compensated since these windings have opposing sense of direction. The current impulse flowing through the input winding II causes appearance of a current impulse in the output winding IV. However, this current impulse, as can be readily established by applying the rule explained in connection with FIG. 1, has a polarity, such that it cannot drive a current over the terminal A owing to the action of the rectifier G$a$. Accordingly, no output impulse will be effected.

In the second operating condition, the signal $x$ will have the value L and the signal $y$ the value O. Accordingly, at the rectifier G$x$ will be the blocking voltage E$x$. The current of the readout pulse will therefore be distributed equally with respect to the input windings II and III which are wound in opposite sense of direction. Consequently, no output impulse will be produced in the output winding IV.

In the third operating condition, the signal $x$ has the value O and the signal $y$ the value L. At the rectifier G$y$ will be the blocking voltage E$y$. The current of the readout pulse will again be distributed in equal parts to two input windings with opposite sense of winding direction, namely, to the windings I and II, and no output pulse will be produced in the output winding IV.

In case of the fourth operating condition, both of the signals $x$ and $y$ will have the value L. Accordingly, there will be the blocking voltage E$x$ on the rectifier G$x$ and the blocking voltage E$y$ on the rectifier G$y$. The readout pulse therefore flows only over the input comparison winding III. In such case, an impulse is induced in the output winding IV, having a polarity such that current will flow through the rectifier G$a$ in pass direction, as can be readily established with the aid of the rule supplied in connection with FIG. 1, such impulse acting as an output impulse.

It will be seen from a consideration of the various operating conditions that an output impulse is delivered only when both of the signals $x$ and $y$ have the value L. The linking circuit is therefore an And-gate circuit.

Figure 5:
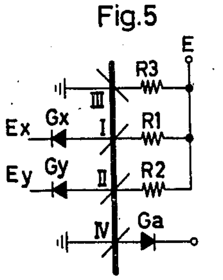

FIG. 5 shows a further example of a linking circuit in which is provided only one output circuit wound in definite sense of direction and provided with a rectifier connected therewith. The construction of this linking circuit differs from the one illustrated in FIG. 4 merely by the sense of direction of the windings I, II and III which differs from that of the corresponding windings in FIG. 4. The consequence of the changed sense of winding direction is that the resulting linking circuit executes a different linking function. This will be brought out upon explaining the four different operating conditions.

When the signals $x$ and $y$ have the value O, the current of the readout pulse will be symmetrically distributed over the input windings I, II and III. The magnetic effect of the currents flowing in the input windings I and II is cancelled due to the fact that these windings are wound in opposite sense of direction. The current impulse conducted to the winding II causes appearance of an output impulse in the output winding IV. The current of such pulse can pass through the rectifier $Ga$. Accordingly, an output pulse is given off in this case.

When the signal $x$ has the value L and the signal $y$ the value O, the current of the readout pulse will be symmetrically distributed over the input windings II and III, since the winding I is blocked against current flow by the blocking voltage on the rectifier $Gx$. The magnetic effect of the currents flowing through the input windings II and III is compensated by the opposite sense of direction of winding thereof and, consequently, no output impulse is given off.

Likewise, for analogous reasons, no output impulse is delievered when the signal $x$ equal O while the signal $y$ equals L, since the readout pulse is again symmetrically distributed over two windings, namely, the windings I and III which are wound in opposite sense of direction.

In case both signals $x$ and $y$ have the value L, the current flow of the blocking voltages $Ex$ and $Ey$ will be blocked in the input windings I and II and the readout pulse will therefore cause a current flow only in the input winding III. The voltage pulse produced in the output winding IV effects the rectifier $Ga$ in blocking direction and no output impulse will consequently be delivered.

An output impulse is delivered by this linking circuit only when both of the signals $x$ and $y$ have the value O. The linking circuit therefore operates in the nature of a so-called Nor-gate circuit.

Figure 6:
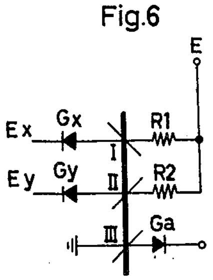

FIG. 6 shows another example of a linking circuit comprising a rectifier cooperating with an output winding which has to be wound in a definite sense of direction.

The repeater core is in this case provided with two input windings I and II, which are wound in opposing sense of direction, and with an output winding III. The resistors R1 and R2 serve for symmetrically distributing the current of the readout pulse to the input windings I and II. An output pulse can be delivered by this linking circuit only when the readout pulse is conducted only to the input winding II. This is the case when the signal $x$ has the value I and the signal $y$ the value O. No output pulse will be delivered by the output winding III in any other operating condition, because there will not be produced therein any impulse or else an impulse with unsuitable polarity.

This linking circuit therefore operates in the manner of a blocking gate circuit, wherein the point at which is connected the signal $x$, that is, the input winding I, is the pass input, and the point at which is connected the signal $y$, that is, the input winding II, is the blocking input. Upon reversing the sense of direction of the windings I and II or of the input comparison winding III, there will be obtained, as will be recognized in view of the symmetry, a blocking gate circuit in which the input winding I functions as the blocking input while the input winding II functions as the pass-through input.

Figure 7:
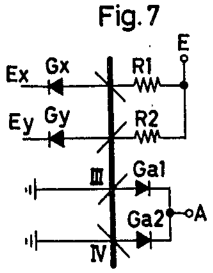

The linking circuit represented in FIG. 7 corresponds to the one shown in FIG. 6 except that there are provided two output windings III and IV which are wound in opposite sense of direction. These output windings are over rectifiers $Ga1$ and $Ga2$ connected with a common terminal A at which output signals are delivered in given cases. It follows, therefore, that this linking circuit delivers an output signal just as the linking circuit according to FIG. 6, when the signal $x$ equal L and the signal $y$ equals O, and likewise delivers an output signal during a readout impulse when the signal $x$ equals O and the signal $y$ equals L. No output impulse is delivered in the case of the other two operating conditions. This linking circuit therefore represents an exclusive Or-gate circuit.

Instead of providing the two output windings III and IV, of the linking circuit shown in FIG. 7, with rectifiers, a single output winding without rectifier could be employed so as to obtain output pulses in the respective operating conditions. However, these output pulses would have different polarity. Accordingly, the use of windings having definite sense of winding direction and cooperating with rectifiers, serves the purpose of avoiding the appearances of output pulses having different polarity.

Figure 8:
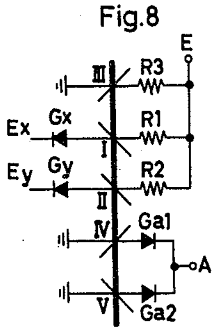

The linking circuit shown in FIG. 8 likewise employs for this purpose output windings with definite sense of winding direction and rectifiers cooperating therewith. The repeater core is in this case provided with input windings I, II, III. The input comparison winding III is wound in opposite sense of direction as compared with an input wnidings I and II. Resistors R1, R2, R3 are respectively disposed ahead of the input windings so as to secure symmetrical distribution of the current of the readout impulses. A comparison of the linking circuit according to FIG. 8 with the one shown in FIG. 4 will reveal obvious similarities, there being complete agreement so far as the input windings I, II, III as well as the output winding IV are concerned. There is however provided a second output winding V. The operation is such that an output impulse is delivered at the common terminal A whenever an impulse appears in the output windings. Accordingly, this linking circuit will not only deliver an output impulse when the signals $x$ and $y$ have the value L, as is the case in the linking circuit according to FIG. 4, but also when the signals $x$ and $y$ have the value O. No impulse will be delivered in the case of the other operating conditions. The corresponding linking circuit can be designated as an equivalence gate circuit. It may be mentioned here that the linking circuit shown in FIG. 4 will execute the same linking function when the rectifier $Ga$ is omitted; however, the output pulses will in such case have different polarities.

In the linking circuits so far described, the magnetic effect produced in the repeater core by the individual input windings, during a readout pulse, is of the same strength. This is achieved by providing the respective input windings with the same number of turns and passing therethrough a current of identical strength. The current of the readout pulse is thereby symmetrically distributed over the various input windings by the use of resistors of identical resistance cooperating with the respective windings. It is possible, if found for some reason necessary or desirable, to provide instead windings with different number of turns and resistors cooperating therewith having different resistances corresponding to the number of turns of the respective windings, so as to compensate for the different number of turns which otherwise would result in magnetic effects of different magnitudes. However, it may also be necessary in connection with linking circuits, to dimension the magnetic effects produced incident to the readout by given input windings so as to be different as compared with the magnetic effects produced by other input windings of the same magnetic core. Further linking functions, not yet mentioned, can be produced in this manner. Accordingly, it is in connection with the windings to be provided upon a repeater core necessary to provide for the correct sense of winding direction as well as for the necessary or desired number of turns of the windings. It is of course understood that it is possible to use resistors with different resistances and input windings with identical number of turns instead of windings with different number of turns and resistors with identical resistance.

Figure 9:
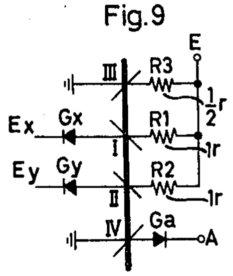

FIG. 9 shows a linking circuit in which the number of turns of the input windings or the magnitude of the individual resistors plays an important part. In this example, there are employed resistors which differ one with respect to the others. Upon the repeater core are provided three input windings which differ from one another merely by the sense of winding direction, the input winding III being wound in a sense of direction opposite to that of the input windings I and II. Resistors R1 and R2 with identical resistance (1*r*) cooperate respectively with the input windings I and II, while a resistor R3 cooperates with the input comparison winding III, which has only half the resistance (½*r*) of any of the other two resistors. The output winding IV is wound in the same sense of direction as the input comparison winding III. The structure corresponds to that shown in FIG. 4 except for the different resistances of the resistors cooperating with the input windings. The provision of resistors with different resistances results in different linking function, thus showing the influence of the magnitude of the resistances.

In a linking circuit according to FIG. 9, the magnetic effect produced by a readout pulse over the input comparison winding III will obviously be twice as great as the magnetic effect produced by either one of the two other input windings I or II. Accordingly, when the signals *x* and *y* have the value O, the magnetic effects of the currents flowing through the windings will be cancelled owing to the opposite sense of direction of winding of the input comparison winding III. No output impulse will be produced. However, this cancellation effect will not occur when one of the signals *x* or *y* has the value L or when both have such value, since one or both of these input windings I and II will be blocked against current flow, and an output impulse will accordingly be produced in the output winding IV. This linking circuit therefore has the linking function of an Or-gate circuit.

The rectifier G*a* disposed for cooperation with the output winding IV of FIG. 9, is so polarized that it does not affect the output pulses. The advantage resulting from the use of this rectifier resides in the possibility of employing a resistor R3 with still lower resistance. The magnetic effect produced by the action of the input comparison winding III will then with certainty exceed the magnetic effect produced jointly by the two input windings I and II. An impulse will then appear in the output winding IV when the signals *x* and *y* have the value O, but such impulse will be relatively weak and will have a polarity such as to produce a blocking action of the rectifier G*a* and, accordingly, such impulse will not act as an output impulse. The use of the rectifier G*a* makes it unnecessary to provide for accurate matching of the resistors in accordance with the previously mentioned rule. The rectifier G*a* has in the linking circuit according to FIG. 9 likewise the purpose of obtaining delivery of output impulses over the output winding IV only in accordance with the desired linking function.

It may be mentioned at this point that, upon dimensioning the resistor R3 exactly like the resistors R1 and R2, the number of turns of the winding III will have to be twice the number of turns as before. The advantage resulting from the use of the rectifier G*a* may be utilized by making the number of turns of the winding III more than twice that of the other windings.

It will in many cases be found advantageous to connect gate circuits ahead of the input windings upon which the readout impulse is distributed, especially gate circuits constructed of rectifiers, over which the signals are extended which are to be linked. Various effects can thereby be achieved; for example, savings can be effected so far as windings are concerned which are to be provided upon the repeater core. For an And-gate such as already described in detail with reference to FIG. 4, there are required four windings. It is now possible, without in any way changing the linking function, to omit one of the two input windings, by disposing ahead of the remaining winding an And-gate circuit to which are conducted the binary signals which are to be linked. Such a linking circuit is represented in FIG. 10.

Figure 10:
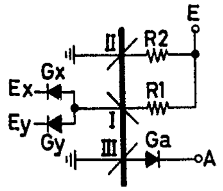
FIG. 10 represents an example to indicate how windings can be saved in given conditions.

The And-gate circuit used for this purpose in FIG. 10 simply comprises the two rectifiers G*x* and G*y* which are at any rate also included in the linking circuit according to FIG. 4. A further expenditure so far as circuit elements are concerned is thus unnecessary. The current flow through the input winding I will be blocked only when the signal *x* and also the signal *y* have the value L, that is, when the voltages E*x* and E*y* are placed on the rectifiers G*x* and G*y*. Only in this case will an output impulse appear in the output winding III and such impulse will be delivered at the terminal A. The arrangement therefore constitutes an And-gate circuit which distinguishes, as compared with simple And-gate circuits constructed with the aid of rectifiers and resistors, by the advantage of providing for an amplifying action. The rectifier G*a* is in connection with the heretofore considered function not absolutely required in the linking circuit according to FIG. 10. However, its use makes it unnecessary, analogous as in connection with FIG. 9, to effect an accurate matching of the magnetic effect produced by the action of the input windings I and II.

Figure 11:
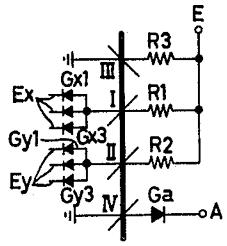
FIGS. 11 and 12 show two examples for the additional use, in connection with such linking circuits, of gate circuits comprising rectifiers.

FIG. 11 shows another example of a linking circuit wherein gate circuits are disposed ahead of the input windings. This linking circuit comprises four windings I . . . IV, corresponding in all respects to the Nor-gate circuit described with reference to FIG. 5. In such linking circuit, an output impulse is delivered, as already explained, only when the input windings I and II are not blocked against current flow. However, And-gate circuits comprising rectifiers are connected ahead of these input windings, that is, rectifiers G*x*1 . . . G*x*3 are connected ahead of the input winding I and rectifiers G*y*1 . . . G*y*3 are connected ahead of the input winding II. The current flow in the input winding I is blocked only when the blocking voltage E*x* is placed on all three rectifiers G*x*1 . . . G*x*3, and the input winding II is similarly blocked against current flow when blocking voltage E*y* is placed on all three rectifiers G*y*1 . . . G*y*3. Six different signals can be linked with the aid of this circuit by respectively placing or not placing the voltages E*x* or E*y* on the rectifiers forming parts of the And-gate circuits.

Figure 12:
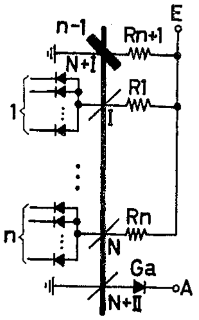

FIG. 12 represents a linking circuit which corresponds to the one illustrated in FIG. 11, having, however, a greater number of input windings wherein the current flow is blocked or made possible, that is, wherein the current flow is controlled. Moreover, the And-gate circuits disposed ahead of the respective input windings, comprise a greater number of rectifiers than the corresponding gate circuit provided in FIG. 11. The linking circuit according to FIG. 12 thus constitutes an embodiment of a more general nature than the one discussed in connection with FIG. 11, therefore also having linking functions corresponding to those which are effected with the aid of the latter. The magnetic effect produced responsive to the extension of a reading pulse to the input comparison winding, is to be matched to the condition resulting from the presence of more than two input windings with controlled current flow. This matching is achieved by employing for the input comparison winding a suitable number of turns. There are provided *n*-input windings with controlled current flow, such windings having identical number of turns and being indicated at I . . . N. The input comparison winding N+1 has ($n-1$) times the number of turns as compared with the other input windings. The peculiarity of this winding is indicated in FIG. 12 by the reference $n-1$ applied to the diagonal line denoting the respective input winding, such line being represented in more prominent manner than the diagonal lines of the remaining input windings. Resistors of identical magnitude are connected with the respective input windings, such resistors being indicated by R1 . . . R$n$+1. It follows, therefore, that an impulse will be delivered at the terminal A of this linking circuit, only responsive to current flow in all input windings, which current flow is controlled in accordance with the signals extended thereto. The linking function of this arrangement thus corresponds, in fact, to that of the arrangement represented in FIG. 1.

Figure 13:
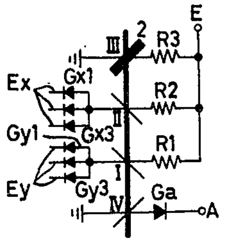
FIGS. 13 to 16 illustrate examples of linking circuits according to the invention, adapted to process more than two binary signals and additionally utilizing gate circuits comprising rectifiers.

FIG. 13 indicates a further linking circuit having gate circuits, comprising rectifiers, disposed ahead of the respective input windings. This circuit corresponds generally to the one already described with reference to FIG. 9 and also having individual resistors connected for cooperation with the input windings I, II and III. The resistor R3 has however exactly the same resistance as any of the resistors R1 and R2, while the resistance of the resistor R3 included in FIG. 9 is only half of the resistance of the respective resistors R1 and R2. Instead of providing the resistor R3 with different resistance, as in FIG. 9, the desired effect is in FIG. 13 obtained by providing the input winding III with twice as many turns as any of the other two input windings. In other words, the winding III has as many turns as all other input windings taken together. The peculiarity of this winding is indicated in FIG. 13 by the numeral 2 entered in connection with the diagonal line which denotes such winding and which is moreover shown more prominently than the remaining diagonal lines. This linking circuit delivers, responsive to a reading pulse extended thereto, an output pulse when the current flow is blocked with respect to at least one of the input windings I and II, thus providing for the linking function of an Or-gate circuit. The blocking voltage $Ex$ or $Ey$, respectively, is for this purpose to be connected either to all rectifiers $Gx1$ . . . $Gx3$ or to all rectifiers $Gy1$ . . . $Gy3$. The circuits formed respectively by the rectifiers $Gx1$ . . . $Gx3$ and $Gy1$ . . . $Gy3$, thus constitute And-gate circuits.

Figure 14:
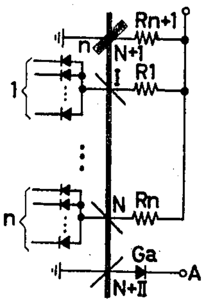

Just as the circuit shown in FIG. 12 represents a generalization of the circuit according to FIG. 11, so does the circuit shown in FIG. 14 represent a generalization of the circuit according to FIG. 13. There are provided, in FIG. 14, $n$-input windings I–N, and the input comparison winding therefore has N+I $n$-times as many turns as any other input winding I . . . N. And-gate circuits comprising a plurality of rectifiers are respectively connected ahead of the individual input windings. The function of this linking circuit corresponds completely to that of the linking circuit shown in FIG. 13.

Figure 15:
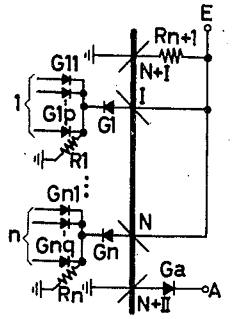

In the linking circuit shown in FIG. 15, gate circuits are likewise connected ahead of the $n$-input windings I . . . N which are controlled by signals. All input windings have the same number of turns. Except for the gate circuits, this linking circuit corresponds completely to the one shown in FIG. 4 which represents an And-gate circuit for linking two binary signals. However, the linking circuit shown in FIG. 15 is, as already noted, provided with $n$-controlled input windings to which are cooperatively related rectifiers G1 . . . $Gn$ which are in given cases placed in blocking condition by means of voltages extended thereto. Only when all these rectifiers are in blocking condition, preventing current flow over the input windings I . . . N during a readout pulse, will an output pulse be delivered over the rectifier $Ga$ connected with the output winding N+II. The resistors R1 . . . $Rn$, serving for limiting the current in the respective input windings I . . . N, are in this circuit disposed between the rectifiers G1 . . . $Gn$ and ground instead of between the terminal E and the respective input windings I . . . N, thus making it possible to cooperatively utilize these resistors for the function of the gate circuits which are disposed ahead of the respective input windings. In the example represented in FIG. 15, each of these resistors is combined with rectifiers to form an Or-gate circuit. Thus, the resistor R1 forms with the rectifiers G11 . . . $G1p$, an Or-gate circuit. These rectifiers are poled in a direction opposite to that of the rectifier G1 which is connected with the input winding I. Upon connecting to one of the rectifiers G11 . . . $G1p$ a voltage which is of a magnitude at least as great as the voltage of the readout pulse, the rectifier G1 will be placed in blocking condition, and the current flow over the input winding I is therefore blocked during the readout pulse. Accordingly, it will suffice in this case to place the blocking voltage on one of the rectifiers G11 . . . $G1p$. A current path extending over the resistor R1 will be open for the readout pulse when there is no blocking voltage on any of these rectifiers. The rectifiers G11 . . . $G1p$ are by the readout pulse placed in blocking direction, thus preventing the passage thereof. A correspondingly constructed Or-gate circuit comprising the rectifiers $Gn1$ . . . $Gnq$ and the resistor $Rn$, is connected ahead of the input winding N. Similar Or-gate circuits may be connected ahead of the other, not illustrated input windings of the linking circuit.

However, ahead of these other input windings may also be disposed And-gate circuits such as are shown in connection with the linking circuits according to FIGS. 11 to 14. As a matter of fact, And-gate circuits as well as Or-gate circuits, or other suitable gate circuits, may be disposed as desired, ahead of the respective input windings, in all linking circuits. Moreover, an additional gate circuit may be provided in connection with the input comparison winding of a linking circuit. An example of this latter arrangement is shown in FIG. 16.

Figure 16:
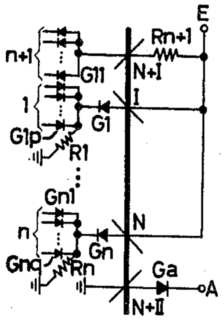

The linking circuit according to FIG. 16 corresponds to the one represented in FIG. 15 with the difference that there is also provided an And-gate circuit built up of rectifiers, for cooperation with the input comparison winding N+I. Upon connecting to all the rectifiers of this additional And-gate circuit a blocking voltage of given magnitude, there will be no current flow of the readout pulse in the input comparison winding N+I, thereby preventing delivery of an output pulse over the output winding N+II, since such output pulse can occur only when the input comparison winding N+I is during a readout pulse traversed by current. Accordingly, the delivery of output pulse can likewise be blocked by the action of the rectifiers of this And-gate circuit.

FIG. 17 indicates a linking circuit which delivers an output pulse only when $m$-signals of $n$-supplied signals have a given identical value, the number $m$ being thereby of course smaller than the number $n$. This identical value is in this case the value O, at which no voltage is connected to the respective input windings of the linking circuit. Since $n$ signals are conducted to the linking circuit, such circuit comprises $n$ controlled input windings, which are in FIG. 17 indicated by I . . . N, only the first and the last such input windings being shown, and such windings having the same number of turns and winding direction. Disposed ahead of the respective windings are identical resistors such as indicated at R1 and $Rn$ and also rectifiers such as indicated at G1 . . . $Gn$. The input comparison winding N+I is moreover provided with the resistor $Rn+1$, which is connected ahead thereof and which is of a magnitude corresponding to that of any one of the resistors R1 . . . $Rn$. The input comparison winding N+1 is wound in a sense of direction opposite to that of the input windings I . . . N, and its number of turns is $m$-times as great as the number of turns of the other input windings.

Assuming $m$-signals with the value O to occur during a readout pulse, there will not be any blocking voltage at the rectifiers of the input windings I . . . N, and current will flow over these input windings during the readout pulse, and current will also flow over the input comparison winding N+1. This latter current will produce a magnetic effect which is $m$-times that produced by the current flowing over any of the other input windings. Moreover, owing to the fact that the input comparison winding is wound in a sense of direction opposite to that of the other input windings, the $m$-times magnetic action produced by the current flowing therethrough will be opposed to the magnetic action produced by the current flowing in the other input windings. The result is, that all the magnetic actions or effects are compensated or cancelled, and that no output pulse will be produced in this case of operation. This compensation or cancelling effect of the magnetic actions is absent in all other cases of operation, that is, in cases when more or fewer than

*m*-signals have the value O, and output pulses will accordingly be delivered in such other cases.

The linking circuit according to FIG. 17 is quite similar to the one shown in FIG. 8 in which two signals are to be linked. No impulse is delivered by the latter linking circuit only when one signal has the value O. Instead of providing only one output winding in FIG. 17, two such output windings with rectifiers connected ahead thereof may be provided in connection therewith, just as in the case of the linking circuit shown in FIG. 8. In such case, the circuit will deliver only output pulses of the same polarity instead of output pulses of different polarity.

It may be noted at this point that the linking circuit according to FIG. 17 is particularly adapted for the supervision of code signals in cases wherein a predetermined number of symbol elements must have identical condition to indicate correct code signals.

It is possible to produce, with the aid of linking circuits according to the invention, arrangements for the processing of groups of binary signals. One group of binary signals may, for example, include signals corresponding to the place values of a plural-place binary number. Each place value has in such case one of two different values, namely, respectively one of the values O or L or 1. It is in connection with equipment for processing communications sometimes necessary to compare plural-place binary numbers, one with respect to others, and to deliver a particular resultant signal upon ascertaining that these numbers are identical. Two groups of binary signals correspond in such a case to the two binary plural place numbers. These signals can be processed for the desired purpose with the aid of a plurality of linking circuits, wherein a readout pulse is extended symmetrically to two input windings wound in opposite sense of direction, and wherein the resultant signal is delivered by two oppositely wound output windings over rectifiers cooperating therewith. An example of such a linking circuit has already been explained with reference to FIG. 7.

FIG. 18 shows an arrangement comprising a plurality of such linking circuits, adapted to process signals corresponding to two *n*-place binary numbers. These signals form two groups allotted to the binary numbers. The two signals which correspond to the same places of the two binary numbers are respectively conducted to the input windings of the same linking circuit. The output windings of all linking circuits are over corresponding rectifiers connected in common to the terminal A. As already explained, an output pulse is delivered by the linking circuits employed, only when the two signals respectively extended thereto, are different. However, in case the signals extended to the linking circuits are identical, no output impulse will be delivered over the terminal A. This is the case when the two binary numbers are identical. The arrangement thus functions in the desired manner.

The binary numbers which are to be compared can be supervised as to the presence of given differences when connecting ahead of the input windings of the linking circuits, inversion circuits which interchange the binary signals. Upon connecting to the output terminal A an inversion circuit which has to deliver the impulses indicated by the comparison result, an impulse will be delivered at the instant when the binary numbers which are being compared, are identical. This may also be provided in connection with the linking circuit according to FIG. 17. It is likewise possible to combine both kinds of inversion circuits so as to obtain a given desired mode of supervision.

FIG. 19 shows an example of a particularly suitable inversion circuit which is adapted to change the value of a binary resultant signal delivered by a linking circuit. The linking circuit used in this case corresponds to the one explained with reference to FIG. 7. It comprises the repeater core M. The inversion circuit comprises the repeater core *Mi* provided with the input windings I and II and the output winding III. The input winding I is connected to the terminal A of the linking circuit and the input winding II is connected to the terminal E over which the readout pulse is extended to both repeaters. Resistors R1 and R2 are disposed ahead of the input windings I and II, such resistors being dimensioned so that in a given case, the same magnetic effects may be produced by the impulses conducted to the input windings. However, these two windings are wound in opposite sense of direction. Accordingly, when an impulse is extended simultaneously to both of these input windings, the magnetic effects will be compensated and no impulse will be produced in the output winding III. This is always the case when an output pulse is delivered at the terminal A, from the linking circuit having the core M. However, when no such output impulse is delivered, there will appear in the output winding III of the inversion circuit an impulse which becomes effective as an output pulse at the terminal A*a*. The desired operation is thus obtained with the aid of the inversion circuit. Such inversion circuit can be provided for cooperation with any of the linking circuits. An accurate compensation of the magnetic effects produced by the currents flowing over the output windings I and II, as in the linking circuit shown in FIG. 10, may be dispensed with upon providing the output winding III with the rectifier G*aa*.

The use of a repeater, as an essential part of the linking circuit according to the invention, makes it possible to employ the circuit in defined manner for further amplification of the delivered output pulses. For this purpose, the output pulse delivered for the resultant signal from an output winding, is conducted to an amplifier system which is circuited in feedback over an auxiliary winding of the repeater, to provide a gain for the control electrode thereof. FIG. 20 indicates an example of a linking circuit comprising such an amplifying system.

The linking circuit shown in FIG. 20 corresponds substantially to the one represented in FIG. 4, constituting an And-gate circuit. An n-p-n transistor T, connected in emitter circuit, is utilized as the amplifying system, the base of the transistor being connected to the terminal A. The winding V serves as the auxiliary winding for the feedback coupling, the collector of the transistor T being connected with such winding over the current limiting resistor R5. The winding V is wound in a sense of direction opposite to that of the output winding IV. In normal condition, there is ground on the base and on the emitter, and the transistor is accordingly not conducting. Base-emitter current will flow when an output pulse appears at the terminal A, such current making the transistor conductive. Accordingly, current will also flow over the feedback winding V, that is, from the terminal U to which is connected a suitable voltage, over winding V, resistor R5, and the collector-emitter path of the transistor T to ground. During the ascendance of this current is induced an additional impulse in the output winding IV which amplifies the output pulse, thus causing the transistor to become quickly fully conductive. The terminal *a*A which is connected with the collector serves as the output terminal for the entire arrangement. In the normal condition, the same voltage as on the terminal U will be on the terminal *a*A, while ground will be on such terminal *a*A during the output pulse.

Changes may be made within the scope and spirit of the appended claims which define what is believed to be new and desired to have protected by Letters Patent.

I claim:

1. A linking circuit with amplifying property, for carrying out linking functions between two or more binary signals to effect delivery of a binary resultant signal, including a repeater having a core and a plurality of windings cooperatively disposed with respect thereto, said repeater requiring, for carrying out a linking function, triggering merely within the linear part of the magnetizing curve of the core material thereof, comprising means for conducting to the linking circuit a readout impulse which supplies the power for the resultant signal signifying the linking result, said resultant signal being represented respectively by the appearance or by the absence of an output pulse, means for distributing said readout impulse over a plurality of input windings of the repeater, the sense of direction of winding and the number of turns of the respective input windings being selected in accordance with the desired linking function, means for respectively blocking or enabling passage of current over predetermined input windings in accordance with the binary value of the signals which are to be linked, so as to produce in a given case, depending upon the binary value of the signals conducted to the linking circuit, in at least one output winding an output pulse forming the resultant signal.

2. A linking circuit according to claim 1, comprising resistor means for determining the strength of the current caused by the readout pulse in the respective input windings, the magnitude of the resistance of said resistor means being matched to the number of turns of the respective input windings.

3. A linking circuit according to claim 1, comprising rectifier means for respectively blocking or enabling passage of current over said input windings, means for disposing the respective rectifier means in series with input windings cooperating therewith, said rectifier means being poled so that current can pass therethrough in the absence of blocking voltage extended to the terminal means thereof which faces away from the respective input winding.

4. A linking circuit according to claim 3, comprising output winding means for delivering output pulses signifying a resultant signal, said output winding means being wound in a sense of direction and being provided with rectifier means connected thereto, so as to effect delivery thereover of output pulses only in accordance with the desired linking function.

5. A linking circuit according to claim 4, comprising output winding means serving for the delivery of an impulse representing the resultant signal, wherein no output impulse for the resultant signal is to be delivered when $n$-signals are extended to said circuit of which $m$-signals have a predetermined identical value, comprising means for distributing the readout impulse to a plurality of similar input windings which are wound in identical sense of direction, means for extending to said input windings the signals which are to be evaluated, an input comparison winding which is wound in a sense of direction opposite to that of input windings, means for likewise extending said readout impulse to said input comparison winding, said input comparison winding producing a magnetic flux in the core which is $m$-times the flux produced by any of said input windings, whereby an impulse for the resultant signal is delivered by said output winding means only when more or fewer than $m$-signals extended to said circuit are identical signals.

6. A linking circuit according to claim 4, comprising gate circuit means cooperatively related to the input windings to which the readout impulse is distributed, and means for extending to said gate circuit the binary signals which are to be linked.

7. A linking circuit according to claim 6, wherein said gate circuits are constructed of rectifiers.

8. A linking circuit according to claim 7, comprising resistor means for determining the current strength in said input windings, and circuit means for functionally combining said resistor means with said gate circuits.

9. An arrangement according to claim 4, comprising, for the forming of a comparison device for plural-place binary numbers, a plurality of linking circuits each having a pair of input windings wound in opposite sense of direction and a pair of output windings likewise wound in opposite sense of direction, means for extending the readout pulse symmetrically to the input windings of each respective pair of input windings, rectifiers cooperatively related to the output windings of each respective pair of output windings, means for conducting the signals allotted to mutually corresponding places of the binary numbers always to the identical linking circuit, whereby the delivery, by said linking circuits, of an output pulse as a resultant signal is responsive to the readout impulse extended thereto, omitted only when the binary numbers which are to be compared are identinal.

10. An arrangement according to claim 1, comprising an inversion circuit cooperatively connected with the output winding means over which the resultant signal is delivered.

11. An arrangement according to claim 1, wherein the respective windings have the identical number of turns and are in given cases traversed by current of identical magnitude.

12. An arrangement according to claim 1, comprising an auxiliary winding for said repeater, amplifier means having a control electrode and being disposed in feedback with the output winding over said auxiliary winding, whereby the output impulse delivered by said output winding is extended to provide a gain for said control electrode.

13. An arrangement according to claim 12, comprising a transistor circuited in emitter circuit and constituting said amplifier means.

No references cited.